US012124883B2

United States Patent
Wang et al.

(10) Patent No.: US 12,124,883 B2
(45) Date of Patent: Oct. 22, 2024

(54) ENERGY EFFICIENCY ADJUSTMENTS FOR A CPU GOVERNOR

(71) Applicant: Huawei Technologies Co., Ltd., Shenzhen (CN)

(72) Inventors: Jun Wang, San Jose, CA (US); Xuefeng Han, Santa Clara, CA (US); Handong Ye, Sunnyvale, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 655 days.

(21) Appl. No.: 17/223,907

(22) Filed: Apr. 6, 2021

(65) Prior Publication Data
US 2021/0224119 A1 Jul. 22, 2021

Related U.S. Application Data

(63) Continuation of application No. PCT/CN2019/091329, filed on Jun. 14, 2019.
(Continued)

(51) Int. Cl.
*G06F 9/50* (2006.01)
*G06F 1/324* (2019.01)

(52) U.S. Cl.
CPC .............. *G06F 9/505* (2013.01); *G06F 1/324* (2013.01)

(58) Field of Classification Search
None
See application file for complete search history.

(56) References Cited

U.S. PATENT DOCUMENTS 6,438,551 B1 * 8/2002 Holmskar .......... H04Q 3/54591
  707/758
7,219,245 B1 * 5/2007 Raghuvanshi ........ G06F 1/3296
  713/340
(Continued)

FOREIGN PATENT DOCUMENTS

CN  1359041 A   7/2002
CN  1737772 A   2/2006
(Continued)

OTHER PUBLICATIONS

"Chinese Application No. 201980070601.0, Chinese Office Action dated Mar. 16, 2023", (Mar. 16, 2023), 13 pgs.
(Continued)

*Primary Examiner* — Adam Lee
(74) *Attorney, Agent, or Firm* — Schwegman Lundberg & Woessner, P.A.

(57) ABSTRACT

Adjusting an operating frequency of a CPU includes setting the operating frequency for a current operating cycle based on a CPU load in a prior operating cycle and a target CPU load. A current CPU load associated with the current processing cycle is detected. The CPU operating frequency is adjusted to a new operating frequency based on a difference between the target CPU load and the current CPU load. The operating frequency is adjusted based on minimizing the difference between the target CPU load and the detected load. A CPU load error is determined based on the current CPU load and the target CPU load. The target CPU load is adjusted based on the determined CPU load error and a threshold load error. A prediction is generated on whether to perform a new adjustment of the operating frequency of the CPU prior to expiration of a threshold time duration.

17 Claims, 11 Drawing Sheets

Related U.S. Application Data

(60) Provisional application No. 62/751,120, filed on Oct. 26, 2018.

(56) References Cited

U.S. PATENT DOCUMENTS

| | | | | |
|---|---|---|---|---|
| 8,621,253 | B1* | 12/2013 | Brown | G06F 1/324 |
| | | | | 713/400 |
| 9,104,411 | B2* | 8/2015 | Thomson | G06F 1/3203 |
| 9,176,572 | B2* | 11/2015 | Thomson | G06F 1/3228 |
| 9,310,872 | B2* | 4/2016 | Aelion | G06F 1/324 |
| 10,496,150 | B2* | 12/2019 | Chen | G06F 9/45558 |
| 2003/0074598 | A1* | 4/2003 | Bossen | G06F 11/0772 |
| | | | | 714/E11.134 |
| 2004/0098631 | A1* | 5/2004 | Terrell, II | G06F 1/324 |
| | | | | 713/322 |
| 2007/0168055 | A1* | 7/2007 | Hsu | G06F 1/324 |
| | | | | 700/32 |
| 2008/0028249 | A1* | 1/2008 | Agrawal | G06F 1/3203 |
| | | | | 713/501 |
| 2008/0141261 | A1* | 6/2008 | Machida | G06F 11/3495 |
| | | | | 714/E11.202 |
| 2009/0013201 | A1* | 1/2009 | He | G06F 1/3203 |
| | | | | 713/322 |
| 2009/0158061 | A1* | 6/2009 | Schmitz | G06F 1/3296 |
| | | | | 713/300 |
| 2009/0204830 | A1* | 8/2009 | Frid | G06F 1/3203 |
| | | | | 713/322 |
| 2009/0230769 | A1* | 9/2009 | Aerts | G06F 1/324 |
| | | | | 307/32 |
| 2009/0319812 | A1* | 12/2009 | Laughlin | G06F 9/5083 |
| | | | | 713/320 |
| 2009/0327791 | A1* | 12/2009 | Aerts | G06F 1/324 |
| | | | | 327/299 |
| 2010/0057404 | A1* | 3/2010 | Dittmann | G06F 1/324 |
| | | | | 702/186 |
| 2011/0046804 | A1* | 2/2011 | Fong | G06F 1/3296 |
| | | | | 700/291 |
| 2011/0113274 | A1* | 5/2011 | Burchard | G06F 1/3203 |
| | | | | 713/300 |
| 2011/0173617 | A1* | 7/2011 | Gargash | G06F 1/3203 |
| | | | | 718/100 |
| 2011/0239220 | A1* | 9/2011 | Gibson | G06F 1/3206 |
| | | | | 718/103 |
| 2012/0030493 | A1* | 2/2012 | Cepulis | G06F 1/3206 |
| | | | | 713/324 |
| 2012/0054503 | A1* | 3/2012 | Hsiao | G06F 1/324 |
| | | | | 713/300 |
| 2012/0311592 | A1* | 12/2012 | Kim | G06F 9/4893 |
| | | | | 718/102 |
| 2013/0031353 | A1* | 1/2013 | Noro | G06F 1/324 |
| | | | | 713/100 |
| 2013/0054989 | A1* | 2/2013 | Judd | G06F 1/324 |
| | | | | 713/320 |
| 2013/0074085 | A1* | 3/2013 | Thomson | G06F 1/3203 |
| | | | | 718/102 |
| 2013/0097415 | A1* | 4/2013 | Li | G06F 9/4893 |
| | | | | 713/100 |
| 2013/0151879 | A1* | 6/2013 | Thomson | G06F 1/3228 |
| | | | | 713/322 |
| 2013/0205149 | A1 | 8/2013 | Chen | |
| 2013/0290751 | A1* | 10/2013 | Mondal | G06F 1/3206 |
| | | | | 713/320 |
| 2014/0101420 | A1* | 4/2014 | Wu | G06F 1/324 |
| | | | | 713/1 |
| 2014/0173150 | A1* | 6/2014 | Yu | G06F 1/3203 |
| | | | | 710/267 |
| 2014/0173311 | A1* | 6/2014 | Park | G06F 1/324 |
| | | | | 713/320 |
| 2014/0223219 | A1* | 8/2014 | Aelion | G06F 1/3206 |
| | | | | 713/400 |
| 2014/0365808 | A1* | 12/2014 | Deshmukh | G06F 1/12 |
| | | | | 713/375 |
| 2015/0082076 | A1* | 3/2015 | Jagmag | G06F 1/04 |
| | | | | 713/600 |
| 2015/0127698 | A1* | 5/2015 | Watkins | H04L 67/125 |
| | | | | 709/201 |
| 2015/0134982 | A1* | 5/2015 | Park | G06F 1/3296 |
| | | | | 713/300 |
| 2015/0193959 | A1* | 7/2015 | Shah | G06F 3/00 |
| | | | | 345/473 |
| 2015/0241942 | A1* | 8/2015 | Venumuddala | G06F 1/3206 |
| | | | | 713/320 |
| 2015/0261583 | A1* | 9/2015 | Vanka | G06F 9/544 |
| | | | | 719/313 |
| 2015/0309552 | A1* | 10/2015 | Vanka | G06F 1/3206 |
| | | | | 713/322 |
| 2016/0004289 | A1* | 1/2016 | Chung | G06F 1/329 |
| | | | | 713/322 |
| 2016/0282930 | A1* | 9/2016 | Ramachandran | G06F 1/3228 |
| 2016/0292120 | A1* | 10/2016 | Sato | G06F 9/30083 |
| 2016/0316485 | A1* | 10/2016 | Kumar | H04W 24/08 |
| 2016/0320825 | A1* | 11/2016 | Panda | G06F 1/3206 |
| 2016/0335737 | A1* | 11/2016 | Shah | G06F 9/5083 |
| 2016/0342191 | A1* | 11/2016 | On | G06F 1/329 |
| 2016/0370844 | A1* | 12/2016 | Kumar | G06F 3/0416 |
| 2017/0068309 | A1* | 3/2017 | Toosizadeh | G06F 1/3296 |
| 2017/0171226 | A1* | 6/2017 | Watkins | H04L 43/04 |
| 2017/0206111 | A1* | 7/2017 | Kannan | G06F 11/3452 |
| 2017/0269629 | A1* | 9/2017 | Chou | G06F 1/3293 |
| 2018/0181188 | A1* | 6/2018 | Park | G06F 1/324 |
| 2018/0275742 | A1* | 9/2018 | Seol | G06F 1/3293 |
| 2018/0365066 | A1* | 12/2018 | Zeng | G06F 1/329 |
| 2019/0018471 | A1* | 1/2019 | Chen | G06F 9/54 |
| 2019/0272002 | A1* | 9/2019 | Seenappa | G06F 1/324 |
| 2020/0401093 | A1* | 12/2020 | Song | G06F 9/5094 |
| 2021/0018971 | A1* | 1/2021 | Rotem | G06F 1/3296 |
| 2021/0124407 | A1* | 4/2021 | Höppner | G06F 1/324 |
| 2021/0208663 | A1* | 7/2021 | Cooper | G06F 1/3228 |

FOREIGN PATENT DOCUMENTS

| | | |
|---|---|---|
| CN | 101576768 A | 11/2009 |
| CN | 103246340 A | 8/2013 |
| CN | 103488532 A | 1/2014 |
| CN | 104423529 A | 3/2015 |
| CN | 105511593 A | 4/2016 |
| CN | 105786615 A | 7/2016 |
| CN | 106527654 A | 3/2017 |
| CN | 106569574 A | 4/2017 |
| JP | 2018156252 A | 10/2018 |
| WO | WO-2020082757 A1 | 4/2020 |

OTHER PUBLICATIONS

"Early worms are eaten by birds et al.", DVFS Governor Interactive-choose_freq() function resolution, (Oct. 27, 2015), 6 pgs.

"International Application No. PCT/CN2019/091329, International Search Report and Written Opinion mailed Sep. 16, 2019", (Sep. 16, 2019), 7 pgs.

Brodowski, Dominik, et al., "CPU frequency and voltage scaling code in the Linux(TM) kernel", Linux CPUFreq, CPUFreq Governors, Information for Users and Developers, retrieved Oct. 2, 2018, https://www.kernel.org/doc/Documentation/cpu-freq/governors.txt, (Oct. 2, 2018), 5 pgs.

Brodowski, Dominik, "Current trends in Linux Kernel Power Management", Proceedings of LinuxTag 2005, (Jun. 4, 2005), 15 pgs.

Pallipadi, Venkatesh, et al., "The Ondemand Governor: Past, Present, and Future", vol. Two, Proceedings of the Linux Symposium, Ottawa, Ontario, Canada, (Jul. 19, 2006), 18 pgs.

\* cited by examiner

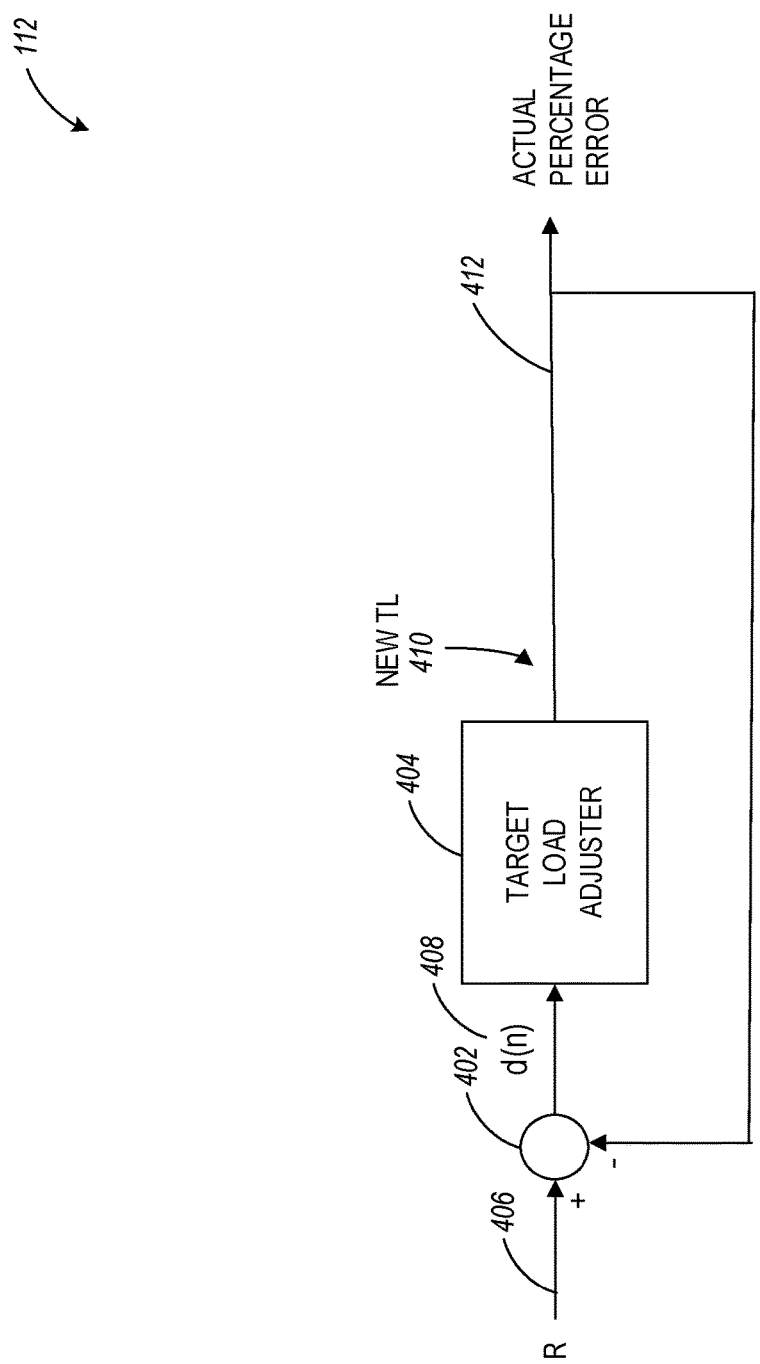

ENERGY EFFICIENCY ADJUSTMENTS FOR A CPU GOVERNOR

CROSS-REFERENCE TO RELATED APPLICATIONS

This application is a continuation application of International Application No. PCT/CN2019/091329, filed Jun. 14, 2019, which claims the benefit of priority to U.S. Provisional Application No. 62/751,120, filed on Oct. 26, 2018, entitled "Energy Efficiency Adjustments for a CPU Governor," the benefit of priority of each of which is claimed herein, and which applications and publication are hereby incorporated herein by reference in their entirety.

TECHNICAL FIELD

The present disclosure is related to power/energy management techniques for mobile devices. Some aspects relate to dynamic voltage frequency scaling (DVFS) techniques for power management. Yet other aspects are related to energy efficiency adjustments for a central processing unit (CPU) governor.

BACKGROUND

Battery life is an important consideration in designing mobile device CPUs and other power consumption circuits. Various power management techniques have been adopted for use in mobile devices, where some techniques can use circuit-level technology that regulates power consumption. However, some power management techniques adjust CPU operating parameters without taking into account the difference between the actual CPU load and the target CPU load. Additionally, after CPU operating parameters are adjusted, the power management techniques can keep the CPU operating under the adjusted operating parameters for a longer than necessary time duration, resulting in higher CPU energy consumption and inefficient CPU operation.

SUMMARY

Various examples are now described to introduce concepts in a simplified form that are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method of adjusting an operating frequency of a central processing unit (CPU). The method includes setting the operating frequency of the CPU for a current operating cycle based on a CPU load in a prior operating cycle and a target CPU load. A current CPU load associated with the current processing cycle of the CPU is detected. The operating frequency of the CPU is adjusted to a new operating frequency based on a difference between the target CPU load and the detected current CPU load.

In a first implementation form of the method according to the first aspect as such, the operating frequency of the CPU is adjusted based on minimizing the difference between the target CPU load and the detected current CPU load.

In a second implementation form of the method according to the first aspect as such or any preceding implementation form of the first aspect, a CPU load error is determined based on the current CPU load associated with the current processing cycle and the target CPU load.

In a third implementation form of the method according to the first aspect as such or any preceding implementation form of the first aspect, the target CPU load is adjusted based on the determined CPU load error and a threshold load error.

In a fourth implementation form of the method according to the first aspect as such or any preceding implementation form of the first aspect, the determining of the CPU load error is based on a difference between the current CPU load and the target CPU load, and the target CPU load is adjusted based on minimizing a difference between the determined CPU load error and a threshold load error.

In a fifth implementation form of the method according to the first aspect as such or any preceding implementation form of the first aspect, feedback with the CPU load error is provided to a combiner module, where the combiner module is configured to generate the difference between the determined CPU load error and the threshold load error.

In a sixth implementation form of the method according to the first aspect as such or any preceding implementation form of the first aspect, the new operating frequency is maintained for at least a threshold time duration.

In a seventh implementation form of the method according to the first aspect as such or any preceding implementation form of the first aspect, an updated current CPU load is determined after adjusting the operating frequency of the CPU to the new operating frequency.

In an eighth implementation form of the method according to the first aspect as such or any preceding implementation form of the first aspect, the method further includes determining whether to perform a new adjustment of the operating frequency of the CPU before the expiration of the threshold time duration, based on the updated current CPU load.

In a ninth implementation form of the method according to the first aspect as such or any preceding implementation form of the first aspect, determining whether to perform the new adjustment of the operating frequency before the expiration of the threshold time duration is further based on one or more of the following: memory access information, graphics processing unit (GPU) current load information, and current load information for at least another CPU.

According to a second aspect of the present disclosure, there is provided a device including a feedback controller module, a memory, and one or more processors. The feedback controller module is configured to select an operating frequency of a central processing unit (CPU) using current CPU load information. The memory stores instructions. The one or more processors are in communication with the memory and the feedback controller, where the one or more processors execute the instructions to set the operating frequency of the CPU for a current operating cycle based on a CPU load in a prior operating cycle and a target CPU load. The one or more processors execute the instructions to detect the current CPU load associated with the current processing cycle of the CPU. The one or more processors execute the instructions to adjust using the feedback controller module, the operating frequency of the CPU to a new operating frequency based on a difference between the target CPU load and the detected current CPU load.

In a first implementation form of the device according to the second aspect as such, where the feedback controller module includes a combiner module, and the one or more processors execute the instructions to provide feedback with the current CPU load to the combiner module. The combiner module is configured to generate the difference between the target CPU load and the detected current CPU load.

In a second implementation form of the device according to the second aspect as such or any preceding implementation form of the second aspect, the device includes a second feedback controller module configured to adjust the target CPU load based on the current CPU load information.

In a third implementation form of the device according to the second aspect as such or any preceding implementation form of the second aspect, the one or more processors execute the instructions to determine a CPU load error based on the current CPU load associated with the current processing cycle and the target CPU load.

In a fourth implementation form of the device according to the second aspect as such or any preceding implementation form of the second aspect, the one or more processors execute the instructions to adjust the target CPU load using the second feedback controller module, based on the determined CPU load error and a threshold load error.

In a fifth implementation form of the device according to the second aspect as such or any preceding implementation form of the second aspect, the one or more processors execute the instructions to determine the CPU load error based on a difference between the current CPU load and the target CPU load and adjust the target CPU load based on minimizing a difference between the determined CPU load error and a threshold load error.

In a sixth implementation form of the device according to the second aspect as such or any preceding implementation form of the second aspect, the second feedback controller module includes a combiner module, and the one or more processors execute the instructions to provide feedback with the CPU load error to the combiner module. The combiner module is also configured to generate the difference between the determined CPU load error and the threshold load error.

In a seventh implementation form of the device according to the second aspect as such or any preceding implementation form of the second aspect, where the new operating frequency is maintained for at least a threshold time duration.

In an eighth implementation form of the device according to the second aspect as such or any preceding implementation form of the second aspect, the one or more processors execute the instructions to determine an updated current CPU load after adjusting the operating frequency of the CPU to the new operating frequency and determine whether to perform a new adjustment of the operating frequency of the CPU before the expiration of the threshold time duration, based on the updated current CPU load.

According to a third aspect of the present disclosure, there is provided a non-transitory computer-readable medium storing instructions for adjusting an operating frequency of a central processing unit (CPU), that when executed by one or more processors, cause the one or more processors to perform operations. The operations include setting the operating frequency of the CPU for a current operating cycle based on a CPU load in a prior operating cycle and a target CPU load. The operations further include detecting the current CPU load associated with the current processing cycle of the CPU. The operations further include adjusting the operating frequency of the CPU to a new operating frequency based on a difference between the target CPU load and the detected current CPU load.

In a first implementation form of the non-transitory computer-readable medium according to the third aspect as such, the instructions further cause the one or more processors to perform operations including determining a CPU load error based on the current CPU load associated with the current processing cycle and the target CPU load and adjusting the target CPU load based on the determined CPU load error and a threshold load error.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 4A is a block diagram illustrating a second feedback controller module for determining target load information, according to some example embodiments.

DETAILED DESCRIPTION

Figure 1:
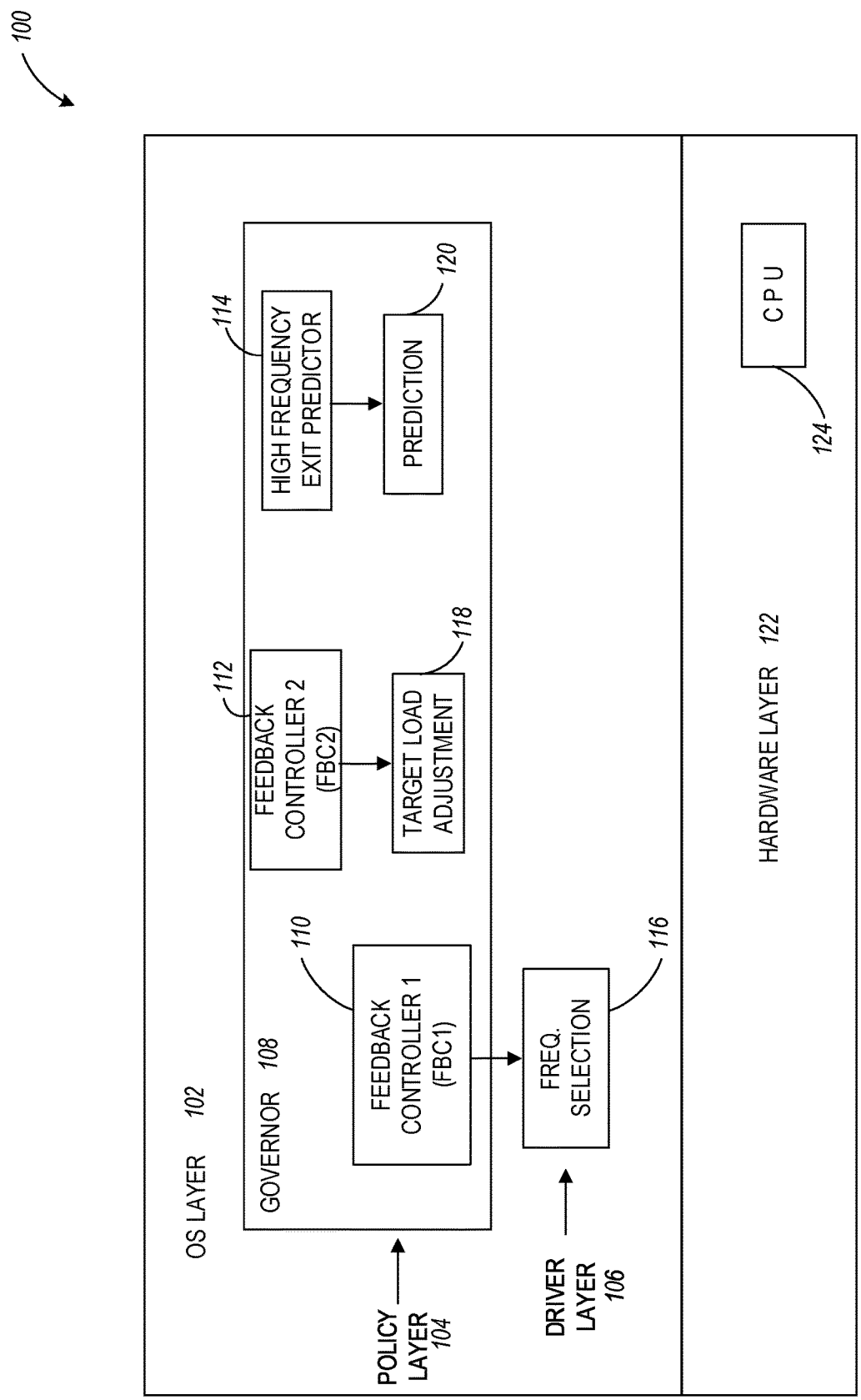
FIG. 1 is an illustration of an operating system layer and hardware layer of a device supporting dynamic voltage and frequency scaling, according to some example embodiments.

It should be understood at the outset that although an illustrative implementation of one or more embodiments is provided below, the disclosed systems and/or methods described with respect to FIGS. 1-10 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

The functions or algorithms described herein may be implemented in software, in one embodiment. The software may consist of computer-executable instructions stored on computer-readable media or a computer-readable storage device such as one or more non-transitory memories or other types of hardware-based storage devices, either local or networked. The software may be executed on a digital signal processor, application-specific integrated circuit (ASIC), programmable data plane chip, field-programmable gate array (FPGA), microprocessor, or other types of processor operating on a computer system, such as a switch, server, or another computer system, turning such a computer system into a specifically programmed machine.

Dynamic Voltage and Frequency Scaling (DVFS) is a technique used for improving the energy efficiency of mobile devices and has been adopted for use in mobile devices. This is a circuit-level technology that regulates power consumption by dynamically adjusting a digital electric circuit's voltage and frequency. The DVFS adjustment subsystem adopts a two-layer structure based on software engineering principles: the policy layer and the driver layer. The policy layer determines how the frequency can be dynamically adjusted, while the driver layer carries out the actual frequency adjustment. The policy layer can include operating system modules known as "governors," with each governor implementing a particular DVFS algorithm. An example governor for Android-based systems is the ondemand governor, which can be configured to periodically monitor the CPU load and switch to the highest frequency when the load is above a predefined threshold.

When selecting a new frequency, a CPU governor (such as ondemand or Interactive) uses a CPU load from the last operating cycle and a target CPU load, i.e., the governor is configured for open-loop control. A drawback of open-loop control is that while the new frequency is selected with the expectation to achieve the target load, whether that goal is achieved or not is not taken into account in the algorithm. Put another way, there is no feedback from the action of selecting the particular frequency. A second drawback is based on the fact that a CPU governor (such as ondemand or Interactive) imposes a time restriction on the current CPU frequency. More specifically, after the CPU frequency is adjusted, the current frequency is used for at least a certain amount of time (Tmin) before a lower frequency can be used. This requirement can cause the CPU to use a higher-than-necessary frequency for a longer-than-necessary period, particularly for frequencies on the higher end of the frequency range.

Techniques disclosed herein for energy efficiency adjustments of a CPU governor can include three components. First, a feedback controller can be used in a closed-loop configuration, where the difference between the target CPU load and the actual/achieved load is used by the governor when determining the CPU frequency in a subsequent operating cycle. Second, an additional controller can be used for adjusting the target load value, when the difference between the target load and the actual load is too high (e.g., greater than a threshold). Third, a predictor can be used to handle operation aspects where the current CPU frequency is equal to or greater than a high-frequency threshold, and the frequency can be adjusted to a lower frequency before the expiration of the Tmin timer (i.e., switch to a lower frequency sooner and avoid being at a high frequency for an unnecessarily long time).

FIG. 1 is an illustration of an operating system layer and hardware layer of a device supporting dynamic voltage and frequency scaling, according to some example embodiments. Referring to FIG. 1, there is illustrated a device 100 which can include an operating system (OS) layer 102 and a hardware layer 122. The OS layer 102 includes a policy layer 104 implementing a governor 108. Governor 108 includes a first feedback controller module 110, a second feedback controller module 112 (configured to perform target load adjustment functionalities 118), and a predictor module 114 (configured to perform a prediction 120). The OS layer 102 further includes a driver layer 106 implementing, e.g., frequency selection functionalities 116 associated with the first feedback controller module 110. In some aspects, the OS layer 102 can be configured to perform power/energy management functionalities, such as DVFS, associated with CPU 124 of the device 100.

An integrated circuit's power consumption, such as the power consumption of the CPU 124, is made up of two major components: dynamic power and static leakage power ($P_{total}=P_{dyn}+P_{leak}$). The dynamic and static leakage power are functions of voltage (V) and clock frequency (f) as follows: $P_{dyn}=\alpha \cdot C \cdot V^2 \cdot f$ and $P_{leak}=V \cdot I_{leak}$, where a is the activity factor representing the circuit's dynamic switching activity, C is the circuit's capacitance, V is the voltage, f is clock frequency, and $I_{leak}$ is the leakage current.

In some aspects, the OS layer 102 can use at least one subsystem (e.g., cpufreq in Linux OS) to implement power/energy management techniques such as DVFS. Additionally, the OS layer subsystem can use a two-layer structure, including a policy layer 104 and a driver layer 106. The policy layer 104 includes one or more OS modules (or governors), each of which can be configured to implement a particular DVFS algorithm (e.g., to determine how a CPU power component, such as frequency, can be dynamically adjusted). The most common governors include ondemand, performance, powersave, and so on. The ondemand governor, for instance, works by periodically monitoring the CPU load and switching to the highest frequency when the CPU load increases above a predefined threshold.

In aspects when device 100 is an Android-based device, the OS layer 102 runs a Linux kernel and thus inherits its power management components, including cpufreq, from the Linux OS. The Android devices, however, are different from Linux desktops/servers in that they are GUI-based and user-oriented. In this regard, governor 108 can be an ondemand governor or an Interactive governor, which can be derived from the ondemand governor but can be configured for handling user interactions in Android-based devices.

In some aspects, governor 108 can include a first feedback controller module 110, a second feedback controller module 112, and a predictor module 114. The first feedback controller module 110 can be configured to perform frequency selection functionalities 116 based on CPU load feedback information, as described hereinbelow. The second feedback controller 112 can be configured to perform target load adjustment functionalities 118 based on CPU load error feedback information, as described hereinbelow. The predictor module 114 can be configured to generate a prediction 120 on whether a lower frequency can be used by the CPU 124 before the expiration of a frequency change timer (e.g., Tmin).

The driver layer 106 can include one or more drivers configured to carry out physical actions in connection with the modules within the policy layer 104. For example, the driver layer 106 can include drivers that carry out actions associated with the frequency selection functionalities 116.

In some aspects, governor 108 can be configured to perform frequency selection for the CPU 124 based on the following pseudo-code:

REPEAT
    When CPU exits idle state, calculate CPU load v in last period.
    IF v>Vhs THEN
        new_freq:=HS or higher
    ELSE
        new_freq:=cur_freq*v/TL
    IF new_freq<cur_freq THEN
        ensure cur_freq is used for at least Tmin The variables in the above pseudo-code can be defined as follows: v is the CPU load in the last period; Vhs is a threshold CPU load for determining whether to increase CPU frequency to hi_speed frequency; HS is the hi_speed frequency, TL is the target CPU load (a CPU load that may be considered ideal for a range of CPU frequencies), and Tmin is a minimum time a CPU frequency is used before the CPU frequency is decreased.

When the CPU load is above Vhs, governor 108 may not immediately select the highest available CPU frequency. Instead, governor 108 may first select hi_speed frequency, before increasing the CPU frequency any further.

Figure 2:
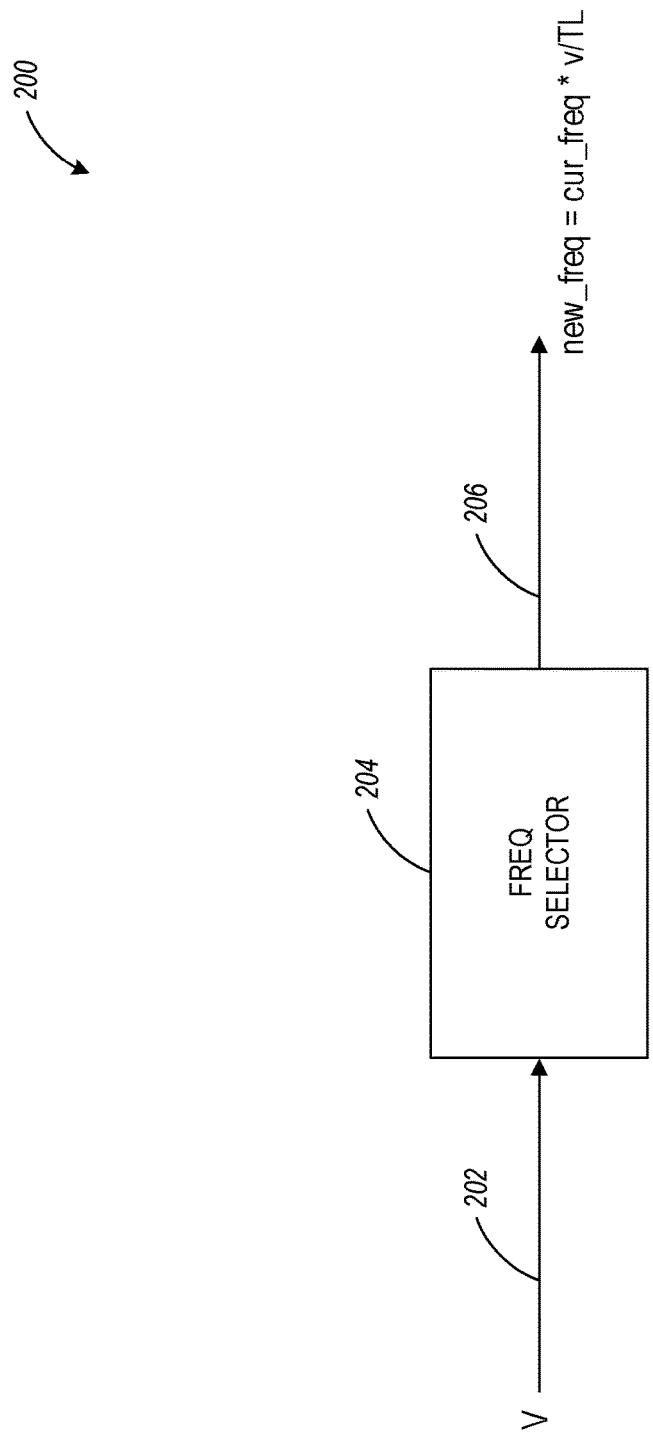
FIG. 2 is a block diagram illustrating an example frequency selector module configured to select CPU operating frequency based on CPU load, according to some example embodiments.

FIG. 2 is a block diagram 200 illustrating an example frequency selector module configured to select CPU operating frequency based on CPU load, according to some example embodiments. Referring to FIG. 2, governor 108 can use the frequency selector module 204 to perform frequency selection in connection with the above-listed pseudo-code. More specifically, when selecting a new frequency, the frequency selector module 204 can perform frequency selection based on the formula new_freq=cur_freq*v/TL, where v is the CPU load in the last period and is communicated as input 202 to the frequency selector module 204. The output 206 of the frequency selector module 204 is the new frequency value (new_freq), calculated based on the current CPU frequency (cur_freq), the CPU loads in the last period (v), and a target CPU load (TL). The rationale for the new frequency formula is to select a frequency such that the CPU load will be TL. However, in some aspects, governor 108 can adopt an open-loop control, as illustrated in FIG. 2. This is because, while the new frequency (new_freq) 206 is selected with the expectation to achieve TL, whether that goal is achieved or not is not taken into account in the algorithm for the frequency selector module 204. In other words, there is no feedback from the action of selecting the particular frequency. In aspects when the CPU utilization is much lower than TL, it can be deduced that either TL is too high, or the selected frequency is not low enough.

In some aspects, before applying a lower frequency than the current one, governor 108 can be configured to imposes a time restriction on the current frequency, namely, the current CPU frequency must be used for at least a certain amount of time (Tmin) before a lower frequency can be used. Such configuration, however, may cause the CPU to use a higher-than-necessary frequency for a longer-than-necessary period, particularly for frequencies on the higher end of the range.

The following Table 1 lists CPU operation parameters (e.g., load and frequency), and can be used to illustrate the above-described deficiencies associated with open-loop frequency selection by the governor 108:

TABLE 1

| | |
|---|---|
| (A) | [ 1866.230712] cpu0 load = 98 |
| | [ 1866.231378] FREQ: 1497600 – CPU: 0 |
| | [ 1866.248921] cpu0 load = 25 |
| | [ 1866.269870] cpu0 load = 18 |
| | [ 1866.289928] cpu0 load = 18 |
| (B) | [ 1866.290761] FREQ: 422400 – CPU: 0 |
| (C) | [ 1866.307944] cpu0 load = 49 |
| | [ 1866.328496] cpu0 load = 46 |
| | [ 1866.347919] cpu0 load = 33 |
| | [ 1866.350419] FREQ: 300000 – CPU: 0 |

Each of the lines in Table 1 starts with a timestamp and indicates either a CPU frequency change or the status of the CPU load as detected by the Interactive governor. Time Tmin is assumed to be 40 ms, and a target CPU load is assumed to be 85. For example, at a time (A) with a timestamp [1866.231378], the CPU frequency is set to 1.4976 GHZ. At the time (B), which is almost 60 ms from (A), the CPU frequency is set to 0.4224 GHz. However, the actual CPU load is 49 (as measured after the CPU frequency change), which is lower than the target load (TL) of 85. This is an example of one of the deficiencies described above, where the open-loop frequency adjustment can cause CPU frequency reduction without accounting for the actual CPU load and how close the actual CPU load is to the target CPU load.

After changing the CPU frequency at the time (A), the CPU load in the following three CPU cycles is low (e.g., 25, 18, and 18). After the $2^{nd}$ cycle with a timestamp [1866.269870], the CPU has been operating at the 1.4976 GHz frequency for almost 38.5 ms, which is slightly less than Tmin=40 ms. Consequently, the CPU remains at a high frequency of 1.4976 GHz for one more cycle, even though the CPU load is low (e.g., 18). This is an example of the second deficiency of open-loop frequency adjustment, where the CPU remains at a higher frequency for longer than necessary.

Figure 3:
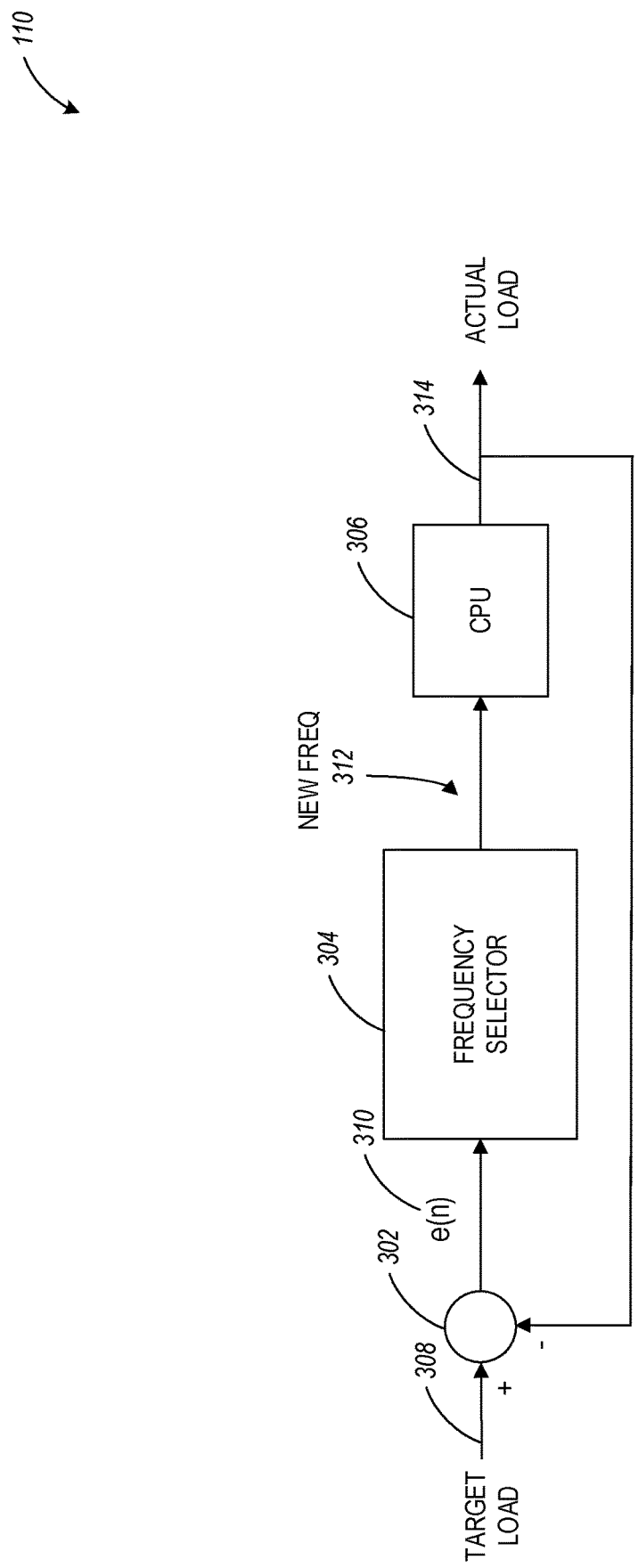
FIG. 3 is a block diagram illustrating a feedback controller module for selecting an operating frequency of a CPU based on feedback information of current CPU load, according to some example embodiments.

FIG. 3 is a block diagram illustrating the first feedback controller module 110 for selecting an operating frequency of a CPU based on feedback information of current CPU load, according to some example embodiments. Referring to FIG. 3, the first feedback controller module 110 can include a combiner module 302 and a frequency selector module 304 configured to select an operating frequency for the CPU 306 based on feedback information (e.g., current CPU load 314).

In operation, the current CPU load (i.e., actual load) 314 is communicated as feedback information to the combiner module 302. The combiner module 302 is configured to generate CPU load error information 310 based on a difference between the target CPU load 308 and the current CPU load 314. The frequency selector module 304 is configured to select a new operating frequency 312 for the CPU 306 based on the generated CPU load error information 310 (indicated as e(n) in FIG. 3). In this regard, governor 108 can set the CPU operating frequency based on a difference between the target load and the actual CPU load, which results in achieving CPU loads that are closer to the target load in comparison with the open-loop configuration of FIG. 2.

In an example embodiment, the feedback controller module 110 can include a single frequency selector module 304 which is configured to select CPU operating frequencies within a range of available frequencies. In another example embodiments, the feedback controller module 110 can include multiple frequency selector modules such as 304, with each frequency selector module being configured to select a specific CPU operating frequency or select a CPU operating frequency from within a sub-range of the range of available frequencies.

FIG. 4A is a block diagram illustrating a second feedback controller module 112 for determining target load information, according to some example embodiments. Referring to FIG. 4A, the second feedback controller module 112 can include a combiner module 402 and a target load adjuster module 404 configured to adjust the CPU target load based on feedback information (e.g., the CPU load error information 412 which can be determined based on the current CPU load information).

In operation, current CPU load information (v) is used to determine the CPU load error information 412 using the current CPU target load (TL) information. For example, the CPU load error information 412 is calculated as (TL-v)/TL and is communicated as feedback information to the combiner module 402. The combiner module 402 is configured to generate target load error information 408 (indicated as d(n) in FIG. 4A) based on a difference between a threshold target load error (R) 406 and the CPU load error information 412. In some aspects, R can be the ideal percentage error between TL and v (e.g., R=10%). The target load adjuster module 404 generates a new target load information 410 based on the target load error information 408. For example, the target load adjuster module 404 generates the new target load information 410 by adjusting an initial target load (e.g., 85%) based on the target load error information 408 (e.g., target load adjustment by the target load adjuster module 404 can be performed when the target load error information 408 is above a threshold). In some aspects, the new target load information 410 can be used by other modules within the governor 108, such as by the first feedback controller module 110, as illustrated in FIG. 4B.

Figure 4B:
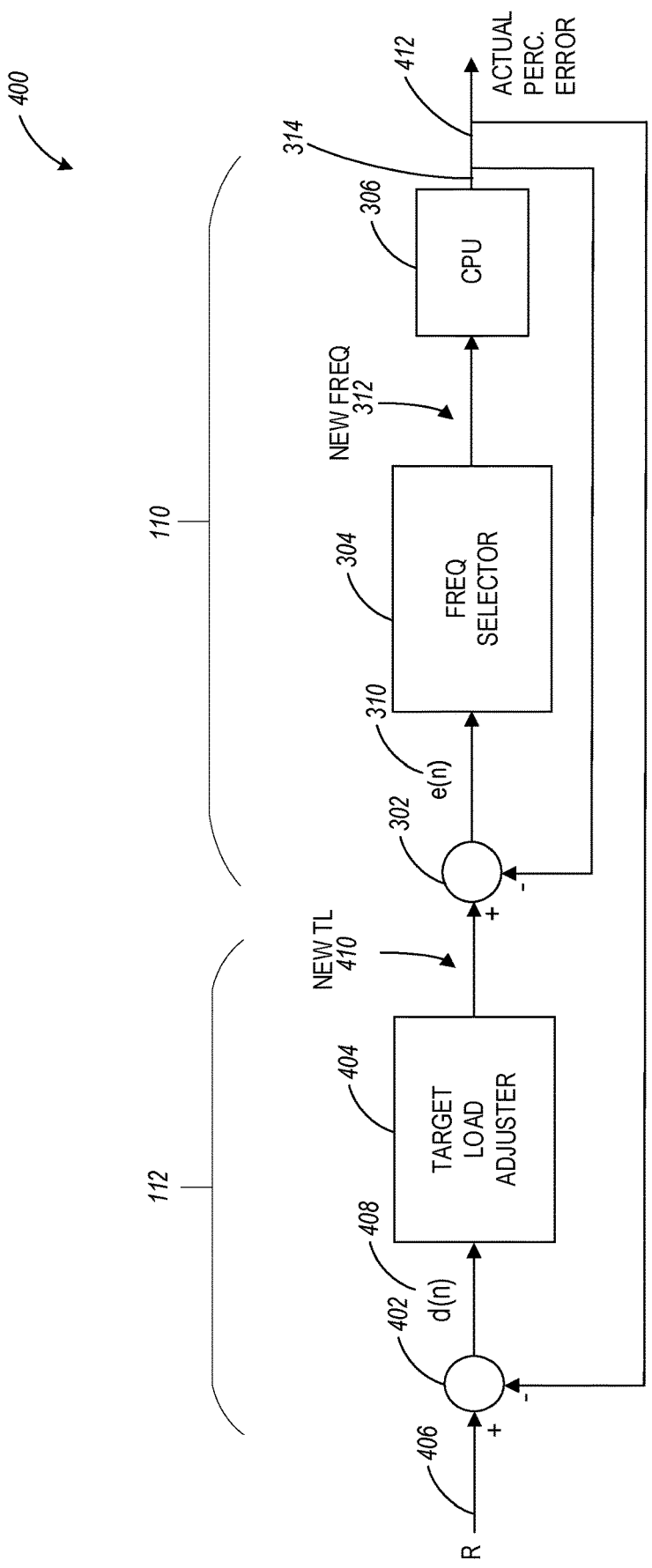
FIG. 4B is a block diagram illustrating the second feedback controller module for determining target load information used by the feedback controller module of FIG. 3, according to some example embodiments.

FIG. 4B is a block diagram 400 illustrating the second feedback controller module for determining target load information used by the feedback controller module of FIG. 3, according to some example embodiments. Referring to FIG. 4B, there is illustrated a more detailed diagram of the second feedback controller module 112, which can be coupled to the first feedback controller module 110.

In operation, the current CPU load 314 (v) is used to determine the CPU load error information 412 using the current CPU target load (TL) information. For example, the CPU load error information 412 is calculated as (TL-v)/TL and is communicated as feedback information to the combiner module 402. The combiner module 402 is configured to generate target load error information 408 (indicated as d(n) in FIG. 4A) based on a difference between a threshold target load error (R) 406 and the CPU load error information 412. In some aspects, R can be the ideal percentage error between TL and v (e.g., R=10%). The target load adjuster module 404 generates a new target load information 410 based on the target load error information 408. For example, the target load adjuster module 404 generates the new target load information 410 by adjusting an initial target load (e.g., 85%) based on the target load error information 408 (e.g., target load adjustment by the target load adjuster module 404 can be performed when the target load error information 408 is above a threshold). The new target load information 410 can be communicated as input to the combiner module 302 within the first feedback controller module 110, as illustrated in FIG. 4B. In this regard, by using the second feedback controller module 112, the target load can be adjusted to a more efficient value in aspects when the initial target load is too high to start with, resulting in the actual load being too low.

Figure 5:
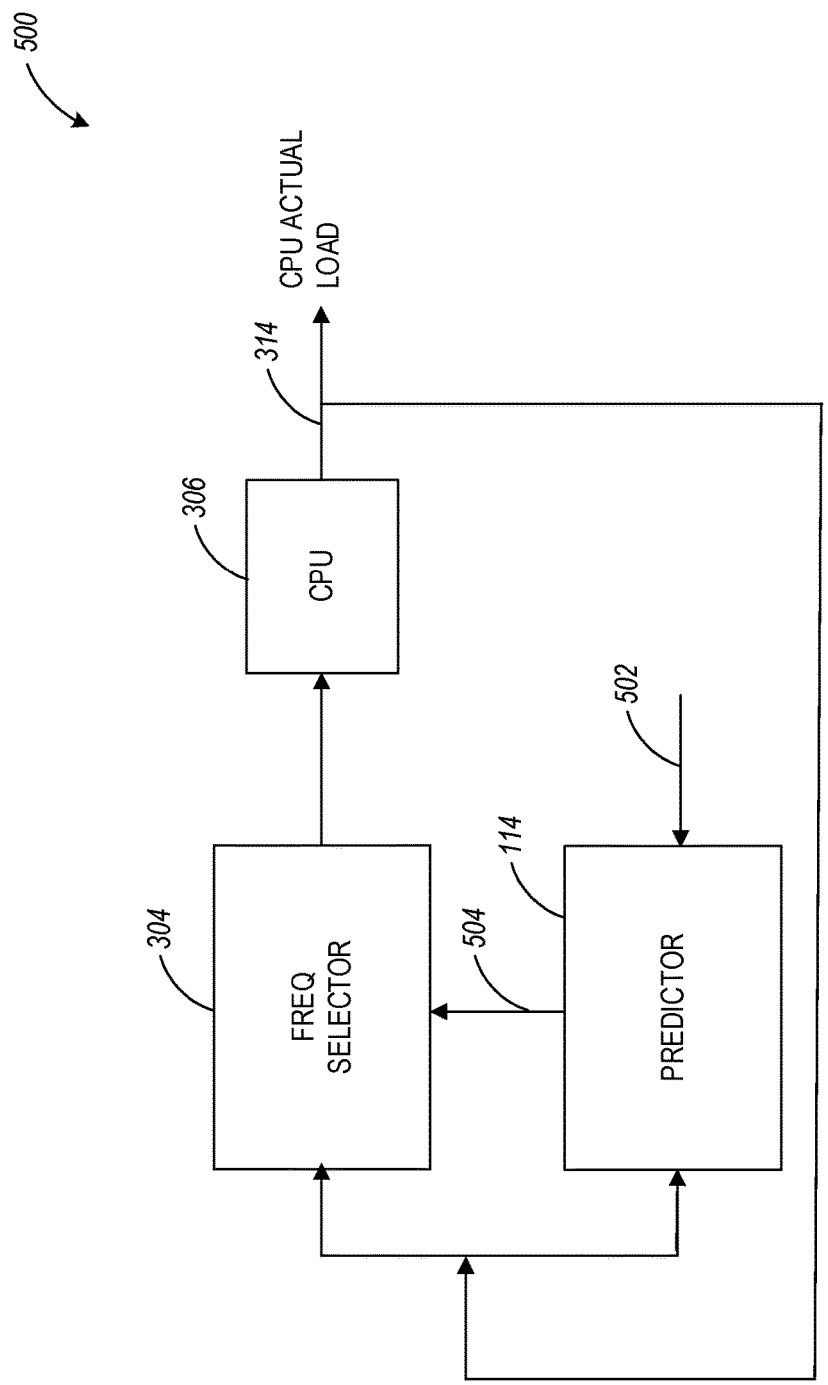
FIG. 5 is a block diagram illustrating a high-frequency exit predictor module using the feedback information of the feedback controller module of FIG. 3, according to some example embodiments.

FIG. 5 is a block diagram 500 illustrating a high-frequency exit predictor module 114 using the feedback information of the feedback controller module of FIG. 3, according to some example embodiments. The predictor module 114 can be configured to operate in connection with the first feedback controller module 110 (e.g., the predictor module 114 is coupled to the frequency selector module 304 of the first feedback controller module 110, as illustrated in FIG. 5).

In operation, the predictor module 114 is configured to receive the same feedback information (i.e., the current CPU load 314) as the frequency selector module 304 which determines the operating frequency for CPU 306. The predictor module 114 can generate a prediction 504 on whether a lower operating frequency can be used by the CPU 306 right away without waiting for the Tmin timer to expire.

In an example embodiment, the predictor module 114 can be used when the current CPU frequency is equal to or greater than a threshold value (e.g., hi_speed as used in the above pseudo-code listing) and the CPU frequency can be decreased. The predictor module 114 can determine if reducing the CPU frequency right away will result in a CPU frequency increase back up to hi_speed right away or soon after the decrease. If prediction 504 indicates that the CPU frequency may need to be increased right away or soon after the decrease, the frequency selector module 304 can keep the current operating frequency. Otherwise, prediction 504 can indicate that the CPU frequency may be decreased right away and the frequency selector module 304 can select a lower frequency. In this regard, the purpose of the prediction 504 generation is to allow the CPU to exit hi_speed and to use a lower frequency as early as possible.

In an example embodiment, the predictor module 114 can be configured to receive additional input 502, which can be used to generate the prediction 504. The additional input 502 can include other system status information, such as memory access information, graphic processing unit (GPU) load information, additional processor core load information, GPU or processor core access information, and so forth.

In another embodiment, the predictor module 114 can be configured to collect actual results on CPU load changes based on the prediction 504, which results can be stored and accessed as historical information. For example, the predictor module 114 can be configured to collect CPU load information after it has predicted that adjusting the CPU frequency to a lower setting will not cause an immediate load surge. If the actual CPU load is below a threshold, the prediction can be considered to be correct. Otherwise, the prediction can be considered to be incorrect. Similarly, the predictor module 114 can collect CPU load information after it has predicted that adjusting the CPU frequency to a lower setting will cause an immediate load surge. If the actual CPU load is above a threshold, the prediction can be considered correct, and otherwise, the prediction can be considered incorrect. In this regard, the historical information can be used by the predictor module 114 to further improve accuracy.

In another embodiment, the predictor module 114 can be maintained at another computing device (e.g., a cloud device) and can be accessed by the governor 108 of device 100 as needed.

In an example embodiment, the predictor module 114 can be configured to operate periodically after a new operation frequency is triggered, and before the expiration of the Tmin timer.

Figure 6:
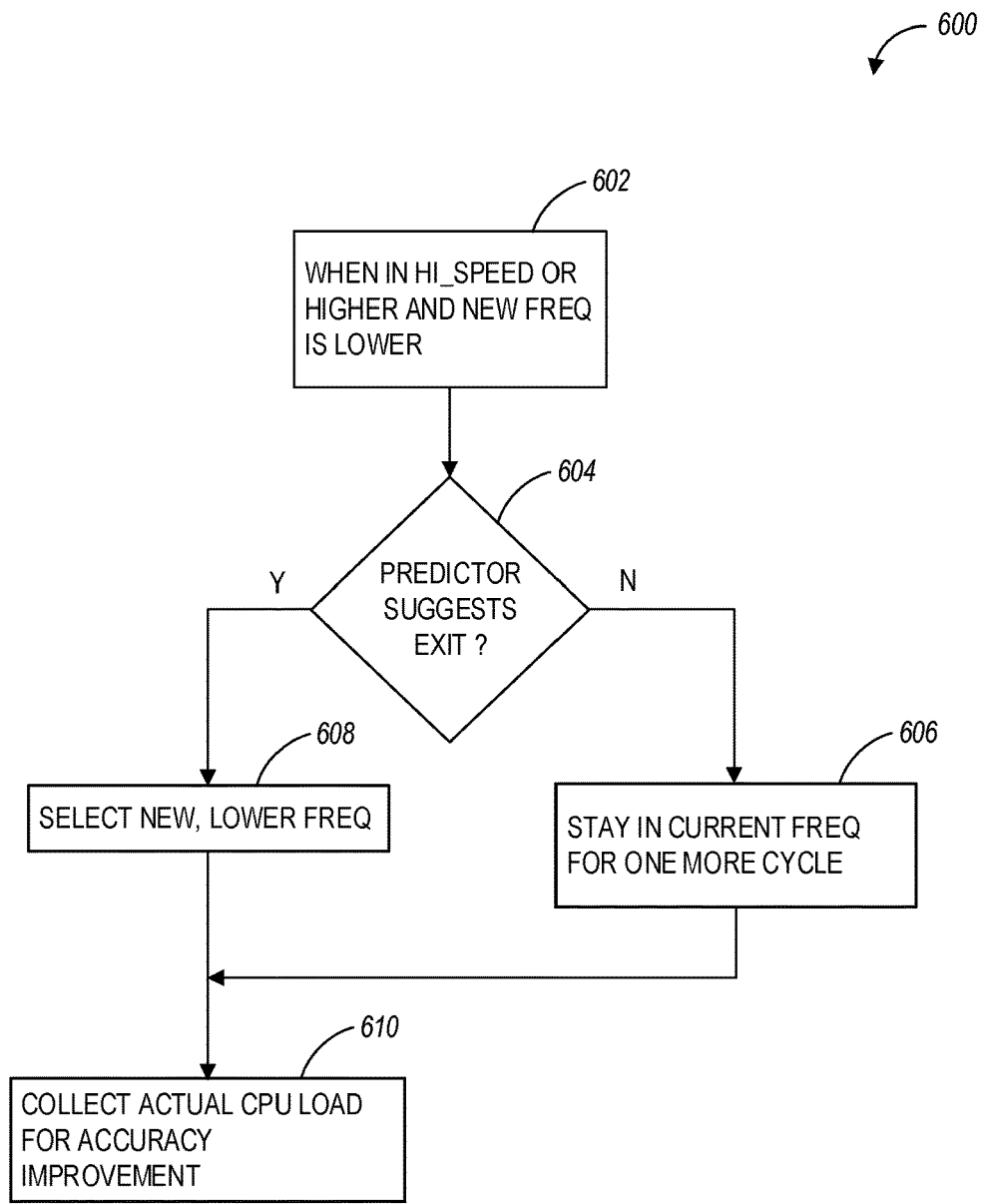
FIG. 6 is a flowchart of a method suitable for the high-frequency exit predictor of FIG. 5, according to some example embodiments.

FIG. 6 is a flowchart of a method suitable for the high-frequency exit predictor of FIG. 5, according to some example embodiments. Method 600 includes operations 602, 604, 606, 608, and 610. By way of example and not limitation, method 600 is described as being performed by the governor 108 within device 100, using one or more of the modules 110-114 of FIG. 1.

At operation 602, the CPU 124 can be operating at the hi_speed frequency (or higher) and the frequency selector module 304 determines a new CPU operation frequency 312, which is lower than the hi_speed frequency. At operation 604, a determination can be made by the predictor module 114 on whether or not to change the hi_speed CPU operation frequency to the new lower frequency. For example, such determination can be based on the prediction 504 generated by the predictor module 114. In aspects when the prediction 504 indicates that a lower operating frequency can be used by the CPU 306 right away without waiting for the Tmin timer to expire, at operation 608, the frequency selector module 304 can select the new lower operating frequency for the CPU. In aspects when the prediction 504 indicates that a lower operating frequency cannot be used by the CPU 306 right away and before the expiration of the Tmin timer, at operation 606, the frequency selector module 304 will not change the CPU operating frequency and the CPU will continue to operate at the hi_speed frequency. At operation 610, the predictor module 114 can collect CPU load information to determine whether or not the prediction 504 was correct, and such results can be used for accuracy improvements of the predictor module 114.

Even though the first feedback controller module 110, the second feedback controller module 112, and the predictor module 114 are illustrated in FIG. 1 as part of the governor 108, these three modules can be configured to perform independently of each other or in various combinations with one another in different embodiments. For example, in one embodiment as illustrated in FIG. 3, the first feedback controller module 110 can operate independently of the other modules 114 and 112. In another embodiment as illustrated in FIG. 4A, the second feedback controller module 112 can operate independently of the other modules 110 and 114. In yet another embodiment as illustrated in FIG. 4B, the first feedback controller module 110 operates in connection with the second feedback controller module 112, and independent of the predictor module 114. Even though the figures illustrate a limited number of combinations of the three modules 110, 112, and 114, the disclosure is not limited in this regard and other combinations of these modules within a governor are also possible.

Figure 7:
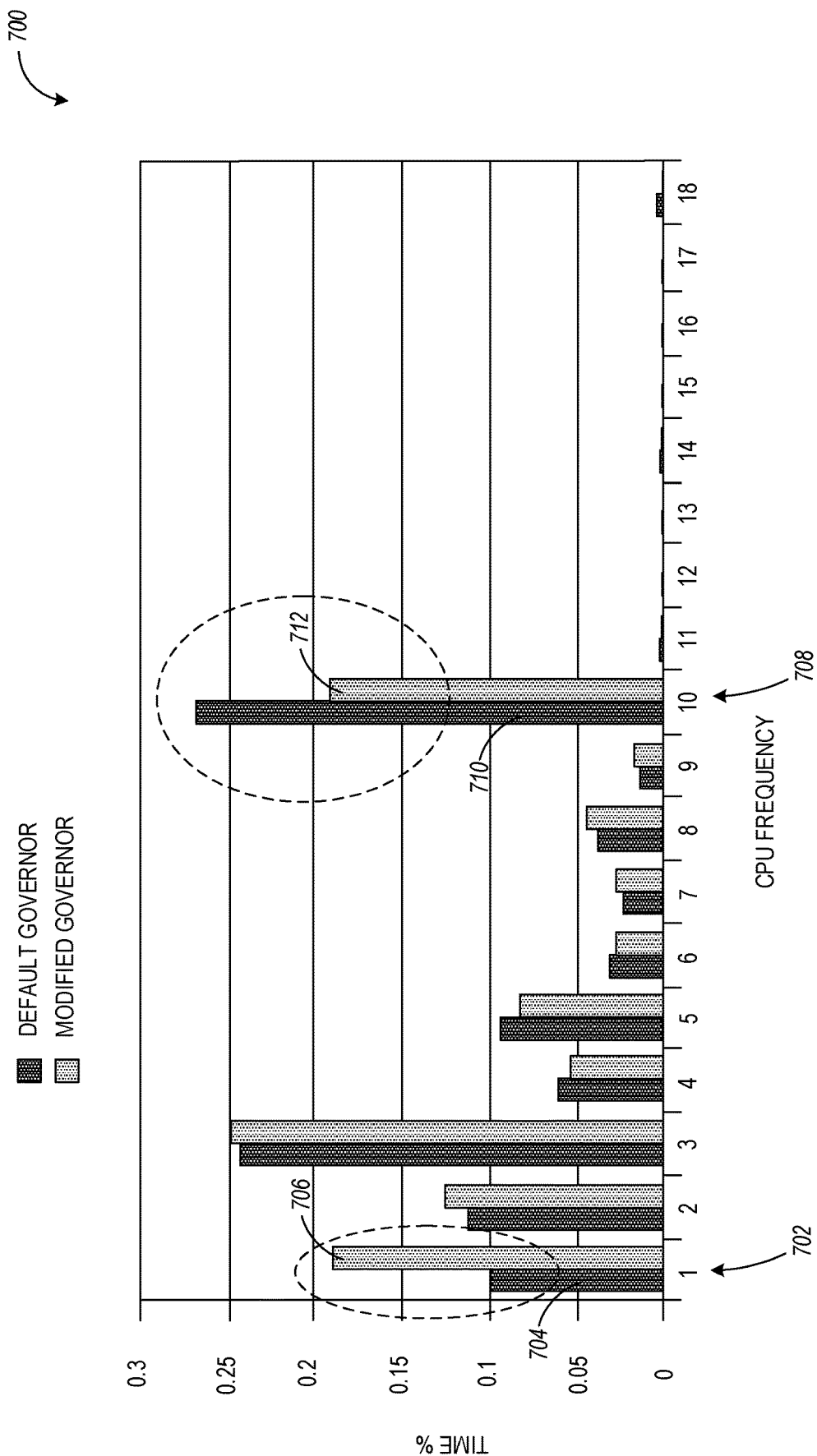
FIG. 7 is an example graph of a CPU frequency histogram under operating conditions with and without the use of the feedback controller modules and the predictor module disclosed herein, according to some example embodiments.

FIG. 7 is an example graph of a CPU frequency histogram 700 under operating conditions with and without the use of the feedback controller modules and the predictor module disclosed herein, according to some example embodiments. Referring to FIG. 7, the CPU frequency histogram 700 includes two graphs—a first graph associated with CPU frequency changes using the default version of governor 108 (e.g., a governor using an open-loop configuration such as illustrated in FIG. 2), and a second graph associated with CPU frequency changes using the modified version of governor 108 (e.g., a governor as illustrated in FIG. 1, using the modules 110, 112, and 114 as discussed herein).

As illustrated in FIG. 7, when the CPU frequency is set near a low-frequency range such as 702, the modified governor causes the device 100 to use the lower CPU frequency for time duration 706, which is more than the time duration 704 associated with the low CPU frequency use under the default governor.

When the CPU frequency is set near a higher frequency range such as 708, the modified governor causes the device 100 to use the higher CPU frequency for time duration 712, which is less than the time duration 710 associated with the higher CPU frequency use under the default governor.

Figure 8:
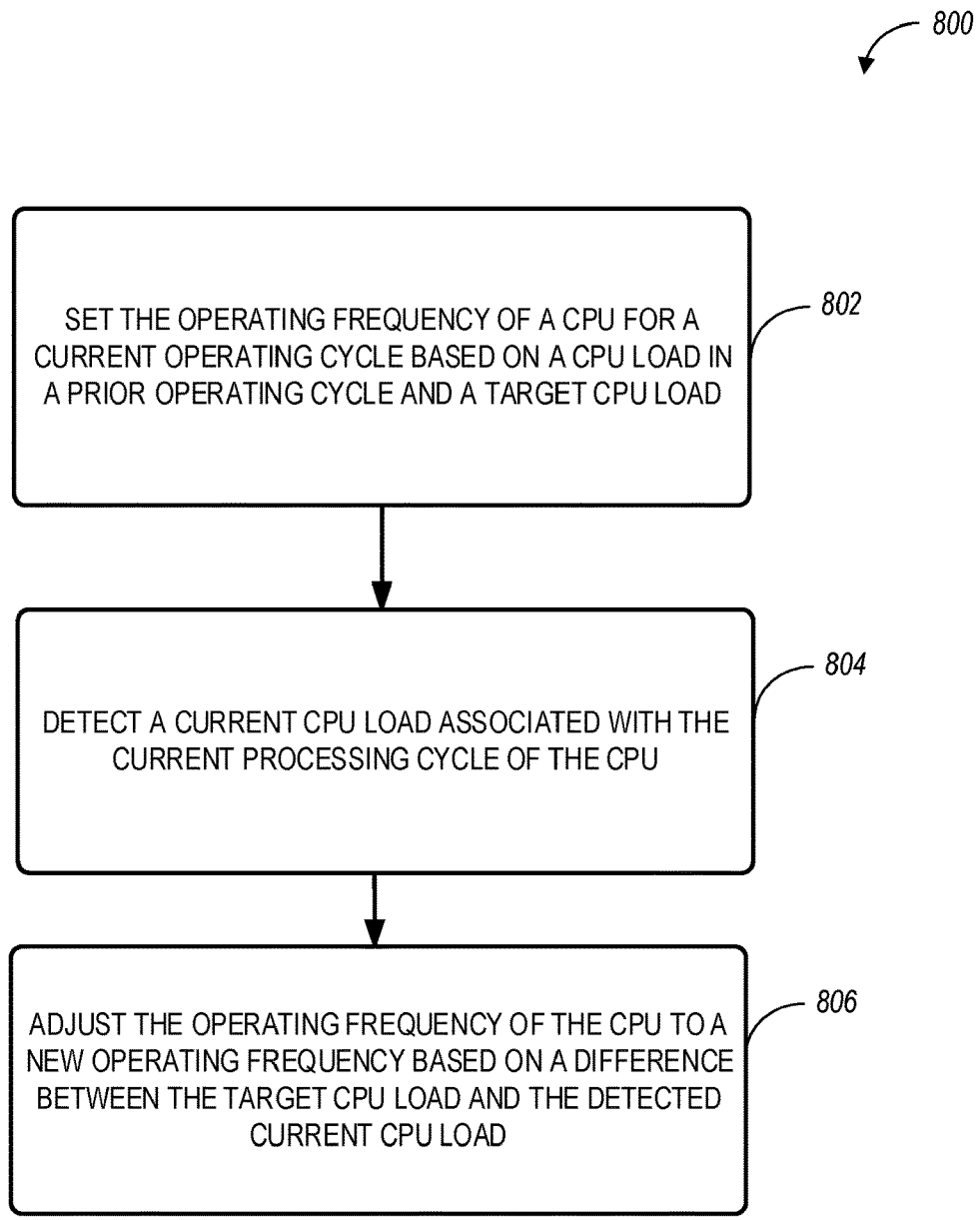
FIG. 8 is a flowchart of a method suitable for energy efficiency adjustments for a CPU, according to some example embodiments.

FIG. 8 is a flowchart of a method suitable for energy efficiency adjustments for a CPU, according to some example embodiments. Method 800 includes operations 802, 804, and 806. By way of example and not limitation, method 800 is described as being performed by the device 1000 using the modules 1060-1070 of FIG. 10 (or modules 960, 962, and 964 of FIG. 9). At operation 802, the first feedback controller module 1060 can set the operating frequency of a CPU (e.g., processor 1005) for a current operating cycle based on a CPU load in a prior operating cycle and a target CPU load. At operation 804, the first feedback controller module 1060 can be configured to detect a current CPU load associated with the current processing cycle of the CPU. For example and as illustrated in FIG. 3, the current CPU load 314 is fed back to the combiner module 302 for calculating a difference between the target load 308 and the current CPU load 314. At operation 806, the frequency selector module 304 can adjust the operating frequency of the CPU to a new operating frequency (e.g., 312) based on the difference (e.g., 310) between the target CPU load and the detected current CPU load.

Figure 9:
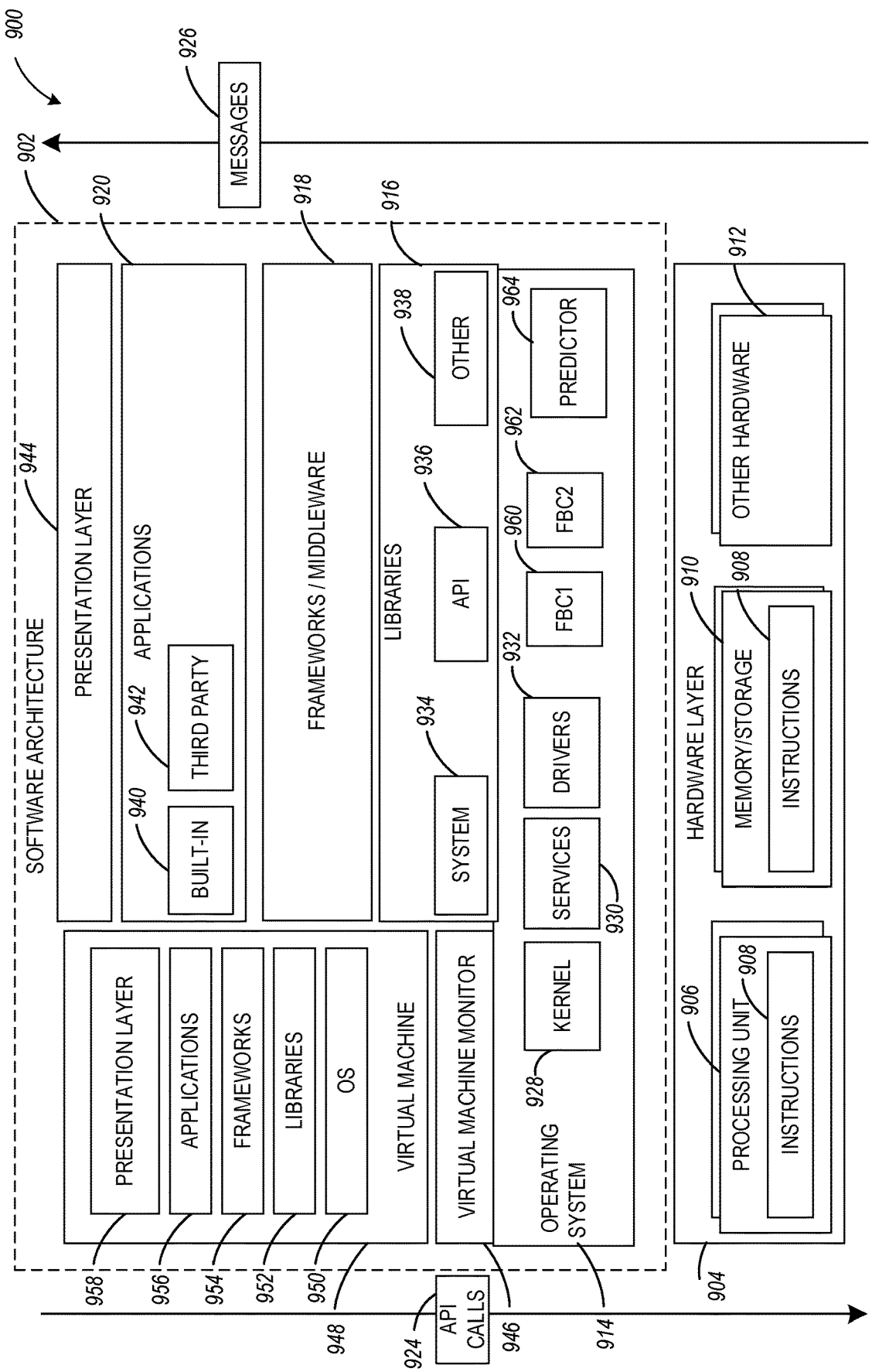
FIG. 9 is a block diagram illustrating a representative software architecture, which may be used in conjunction with various device hardware described herein, according to some example embodiments.

FIG. 9 is a block diagram illustrating a representative software architecture 900, which may be used in conjunction with various device hardware described herein, according to some example embodiments. FIG. 9 is merely a non-limiting example of software architecture 902 and it will be appreciated that many other architectures may be implemented to facilitate the functionality described herein. The software architecture 902 may be executing on hardware such as device 1000 of FIG. 10 that includes, among other things, processor 1005 (also referred to as CPU 1005), memory 1010, storage 1015 and 1020, and I/O components 1025 and 1030. A representative hardware layer 904 is illustrated and can represent, for example, the device 1000 of FIG. 10. The representative hardware layer 904 comprises one or more processing units 906 having associated executable instructions 908. Executable instructions 908 represent the executable instructions of the software architecture 902, including implementation of the methods, modules, and so forth of FIGS. 1-8. Hardware layer 904 also includes memory and/or storage modules 910, which also have executable instructions 908. Hardware layer 904 may also comprise other hardware 912, which represents any other hardware of the hardware layer 904, such as the other hardware illustrated as part of device 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920, and presentation layer 944. Operationally, the applications 920 and/or other components within the layers may invoke application programming interface (API) calls 924 through the software stack and receive a response, returned values, and so forth illustrated as messages 926 in response to the API calls 924. The layers illustrated in FIG. 9 are representative in nature and not all software architectures 902 have all layers. For example, some mobile or special purpose operating systems may not provide a framework/middleware 918, while others may provide such a layer. Other software architectures may include additional or different layers.

The operating system 914 may manage hardware resources and provide common services. The operating system 914 may include, for example, a kernel 928, services 930, drivers 932, a first feedback controller module 960, a second feedback controller module 962, and a predictor module 964. The kernel 928 may act as an abstraction layer between the hardware and the other software layers. For example, kernel 928 may be responsible for memory management, processor management (e.g., scheduling), component management, networking, security settings, and so on. Services 930 may provide other common services for the other software layers. Drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

In some aspects, the first feedback controller module 960 can provide the same functionalities as the feedback controller module 110 for providing CPU frequency selection based on feedback information, as discussed in connection with, e.g., FIG. 1, FIG. 3, and FIGS. 4A-4B. The second feedback controller module 962 can provide the same functionalities as the feedback controller module 112 for providing CPU target load selection based on feedback information, as discussed in connection with, e.g., FIG. 1, FIG. 3, and FIGS. 4A-4B. The predictor module 964 can provide the same functionalities as the predictor module 114 for providing high-frequency exit predictions, as discussed in connection with, e.g., FIG. 1, FIG. 5, and FIG. 6.

Libraries 916 may provide a common infrastructure that may be utilized by the applications 920 and/or other components and/or layers. The libraries 916 typically provide functionality that allows other software modules to perform tasks more easily than to interface directly with the underlying operating system 914 functionality (e.g., kernel 928, services 930, drivers 932, feedback controller modules 960/962, and/or predictor module 964). Libraries 916 may include system libraries 934 (e.g., C standard library) that may provide functions such as memory allocation functions, string manipulation functions, mathematic functions, and the like. Also, libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. Libraries 916 may also include a wide variety of other libraries 938 to provide many other APIs to the applications 920 and other software components/modules.

The frameworks/middleware 918 (also sometimes referred to as middleware) may provide a higher-level common infrastructure that may be utilized by the applications 920 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 920 and/or other software components/modules, some of which may be specific to a particular operating system 914 or platform.

The applications 920 include built-in applications 940 and/or third-party applications 942. Examples of representative built-in applications 940 may include but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930, drivers 932, feedback controller modules 960/962, and/or predictor module 964), libraries (e.g., system libraries 934, API libraries 936, and other libraries 938), and frameworks/middleware 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the device 1000 of FIG. 10, for example). A virtual machine 948 is hosted by a host operating system (operating system 914 in FIG. 9) and typically, although not always, has a virtual machine monitor 946, which manages the operation of the virtual machine 948 as well as the interface with the host operating system (i.e., operating system 914). A software architecture 902 executes within the virtual machine 948 such as an operating system 950, libraries 952, frameworks/middleware 954, applications 956, and/or presentation layer 958. These layers of software architecture executing within the virtual machine 948 can be the same as corresponding layers previously described or may be different.

Figure 10:
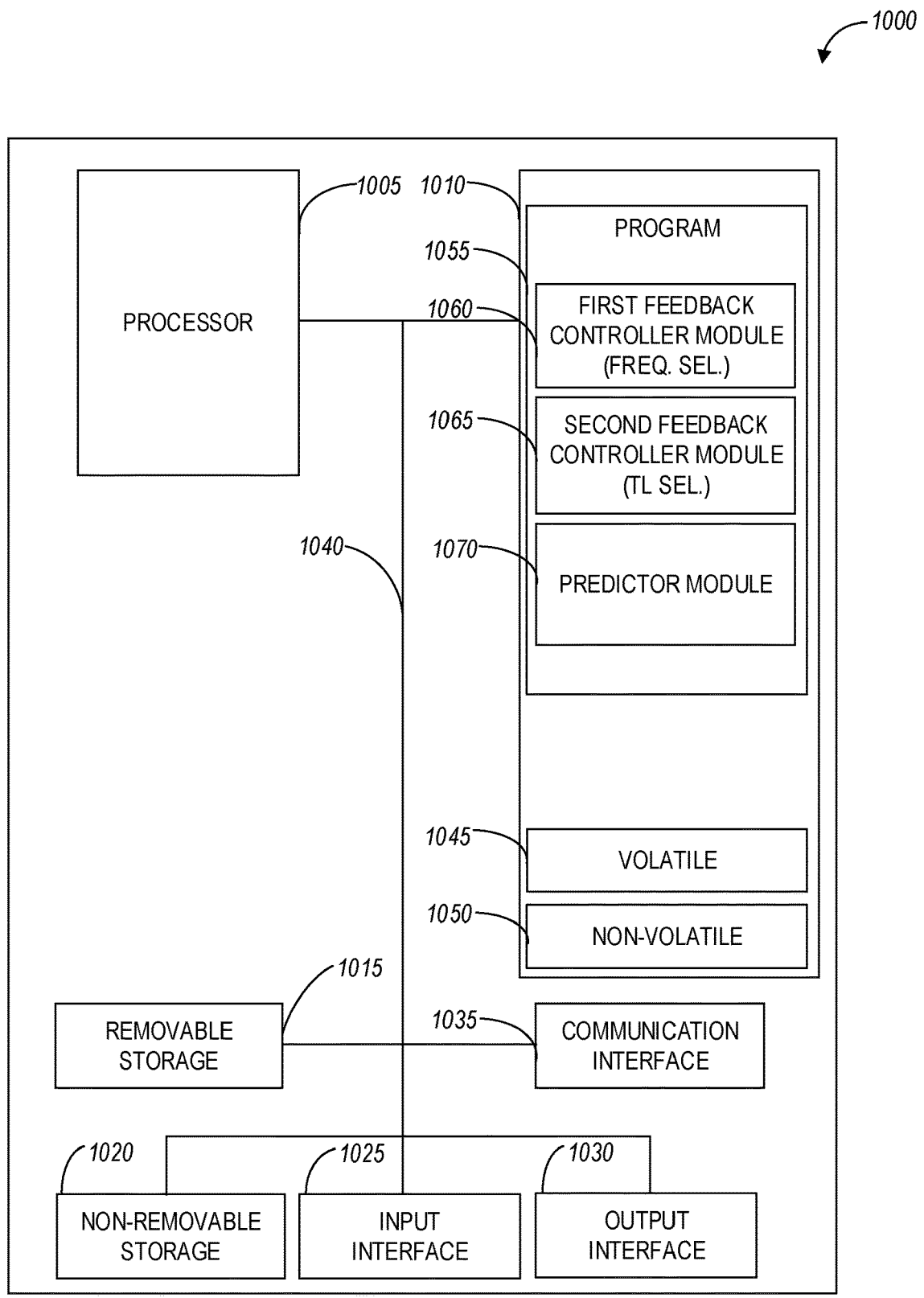
FIG. 10 is a block diagram illustrating circuitry for a device that implements algorithms and performs methods, according to some example embodiments.

FIG. 10 is a block diagram illustrating circuitry for a computing device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1000 (also referred to as computing device 1000, computer system 1000, or computer 1000) may include a processor 1005, memory 1010, removable storage 1015, non-removable storage 1020, input interface 1025, output interface 1030, and communication interface 1035, all connected by a bus 1040. Although the example computing device is illustrated and described as the computer 1000, the computing device may be in different forms in different embodiments.

The memory 1010 may include volatile memory 1045 and non-volatile memory 1050 and may store a program 1055. The computer 1000 may include—or have access to a computing environment that includes—a variety of computer-readable media, such as the volatile memory 1045, the non-volatile memory 1050, the removable storage 1015, and the non-removable storage 1020. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1055 stored in the memory 1010) are executable by the processor 1005 of the computer 1000. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1055 may utilize a customer preference structure using modules discussed herein, such as a first feedback controller module 1060, a second feedback controller module 1065, and a predictor module 1070. The first feedback controller module 1060, the second feedback controller module 1065, and the predictor module 1070 may be the same as the first feedback controller module 960, the second feedback controller module 962, and the predictor module 970, respectively, as discussed in connection with FIG. 9.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, one or more of the modules 1060-1070 can be integrated as a single module, performing the corresponding functions of the integrated modules.

In an example embodiment, the computing device 1000 includes a frequency setting module setting the operating frequency of the CPU 1005 for a current operating cycle based on a CPU load in a prior operating cycle and a target CPU load, a current detection module detecting a current CPU load associated with the current processing cycle of the CPU 1005, and a frequency adjustment module adjusting the operating frequency of the CPU 1005 to a new operating frequency based on a difference between the target CPU load and the detected current CPU load. In some embodiments, the computing device 1005 may include other or additional modules for performing any one of or combination of steps described in the embodiments. Further, any of the additional or alternative embodiments or aspects of the method, as shown in any of the figures or recited in any of the claims, are also contemplated to include similar modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above regarding any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein are for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" (and variations thereof herein) are used broadly and encompass direct and indirect connections, couplings, and mountings. Also, the terms "connected" and "coupled" (and variations thereof) are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or another unit suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. As used herein, "machine-readable medium" (or "computer-readable medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or combination of multiple media, that is capable of storing instructions for execution by one or more processors 1005, such that the instructions, when executed by one or more processors 1005, cause the one or more processors 1005 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method comprising:
setting an operating frequency of a central processing unit (CPU) for a current operating cycle based on a CPU load in an operating cycle prior to the current operating cycle and a target CPU load, the target CPU load including a desired CPU load value in an operating cycle subsequent to the current operating cycle;
operating the CPU according to the operating frequency in the current operating cycle, wherein during the current operating cycle a difference between the target CPU load and a current CPU load in the current operating cycle of the CPU exceeds a threshold, the CPU consuming a first amount of power associated with the operating frequency during the current operating cycle;

adjusting the operating frequency of the CPU to a new operating frequency to minimize the difference between the target CPU load and the current CPU load and prior to expiration of a timer when the adjusting will not result in a CPU load surge during the subsequent operating cycle, the minimized difference being less than the threshold; and operating the CPU according to the new operating frequency in the subsequent operating cycle, wherein the CPU consumes a second amount of power associated with the new operating frequency during the subsequent operating cycle, the second amount of power being less than the first amount of power, and the new operating frequency being less than the operating frequency.

2. The computer-implemented method according to claim 1, further comprising:

adjusting the target CPU load based on a CPU load error and a threshold load error, the CPU load error being based on the current CPU load and the target CPU load.

3. The computer-implemented method according to claim 2, the method further comprising:

adjusting the target CPU load when a difference between the CPU load error and a threshold load error is equal to a minimum error threshold, the CPU load error based on the difference between the current CPU load and the target CPU load.

4. The computer-implemented method according to claim 3, further comprising:

providing a feedback with the CPU load error to a combiner module, wherein the combiner module is configured to output the difference between the CPU load error and the threshold load error.

5. The computer-implemented method according to claim 1, wherein the new operating frequency is maintained for at least a threshold time duration.

6. The computer-implemented method according to claim 5, further comprising:

performing a new adjustment of the operating frequency of the CPU prior to expiration of the threshold time duration based on an updated current CPU load subsequent to adjusting the operating frequency of the CPU.

7. The computer-implemented method according to claim 6, wherein performing the new adjustment of the operating frequency prior to the expiration of the threshold time duration is further based on one or more of memory access information, graphics processing unit (GPU) current load information, or current load information for at least another CPU.

8. A device comprising:

a feedback controller;

a memory storing instructions; and at least one processor in communication with the memory and the feedback controller, the at least one processor configured, upon execution of the instructions, to perform the following steps:

set an operating frequency of a central processing unit (CPU) for a current operating cycle based on a CPU load in an operating cycle prior to the current operating cycle and a target CPU load, the target CPU load including a desired CPU load value in an operating cycle subsequent to the current operating cycle;

operate the CPU according to the operating frequency in the current operating cycle, wherein during the current operating cycle a difference between the target CPU load and a current CPU load in the current operating cycle of the CPU exceeds a threshold, the CPU consuming a first amount of power associated with the operating frequency during the current operating cycle;

adjust, using the feedback controller, the operating frequency of the CPU to a new operating frequency to minimize the difference between the target CPU load and the current CPU load and prior to expiration of a timer when the adjusting will not result in a CPU load surge during the subsequent operating cycle, the minimized difference being less than the threshold; and operate the CPU according to the new operating frequency in the subsequent operating cycle, wherein the CPU consumes a second amount of power associated with the new operating frequency during the subsequent operating cycle, the second amount of power being less than the first amount of power, the new operating frequency being less than the operating frequency, and the at least one processor being different than the CPU.

9. The device according to claim 8, wherein the feedback controller comprises a combiner module, and the at least one processor executes the instructions to:

provide a feedback with the current CPU load to the combiner module, wherein the combiner module is configured to output the difference between the target CPU load and the current CPU load.

10. The device according to claim 8, further comprising:

a second feedback controller configured to adjust the target CPU load based on the current CPU load information.

11. The device according to claim 10, wherein the at least one processor executes the instructions to adjust the target CPU load based on a CPU load error and a threshold load error, the CPU load error being based on the current CPU load associated with the current processing cycle of the CPU and the target CPU load.

12. The device according to claim 11, wherein the at least one processor executes the instructions to adjust the target CPU load to minimize a difference between the CPU load error and a threshold load error, the CPU load error based on the difference between the current CPU load and the target CPU load.

13. The device according to claim 12, wherein the second feedback controller comprises a combiner module, and the at least one processor executes the instructions to:

provide a feedback with the CPU load error to the combiner module, wherein the combiner module is configured to output the difference between the CPU load error and the threshold load error.

14. The device according to claim 13 wherein the new operating frequency is maintained for at least a threshold time duration.

15. The device according to claim 14, wherein the at least one processor executes the instructions to perform a new adjustment of the operating frequency of the CPU prior to expiration of the threshold time duration based on an updated current CPU load subsequent to adjusting the operating frequency of the CPU.

16. A non-transitory computer-readable medium storing computer instructions, that configure at least one processor, upon execution of the instructions, to perform the following steps:

setting an operating frequency of a central processing unit (CPU) for a current operating cycle based on a CPU load in an operating cycle prior to the current operating cycle and a target CPU load, the target CPU load including a desired CPU load value in an operating cycle subsequent to the current operating cycle;

operating the CPU according to the operating frequency in the current operating cycle, wherein during the current operating cycle a difference between the target CPU load and a current CPU load in the current operating cycle of the CPU exceeds a threshold, the CPU consuming a first amount of power associated with the operating frequency during the current operating cycle;

adjusting the operating frequency of the CPU to a new operating frequency to minimize the difference between the target CPU load and the current CPU load and prior to expiration of a timer when the adjusting will not result in a CPU load surge during the subsequent operating cycle, the minimized difference being less than the threshold; and operating the CPU according to the new operating frequency in the subsequent operating cycle, wherein the CPU consumes a second amount of power associated with the new operating frequency during the subsequent operating cycle, the second amount of power being less than the first amount of power, the new operating frequency being less than the operating frequency, wherein the non-transitory computer-readable medium excludes transitory signals, and the at least one processor being different than the CPU.

17. The non-transitory computer-readable medium of claim 16, wherein upon execution, the instructions further cause the at least one processor to perform operations comprising adjusting the target CPU load based on a CPU load error and a threshold load error, the CPU load error being based on the current CPU load associated with the current processing cycle of the CPU and the target CPU load.

\* \* \* \* \*

UNITED STATES PATENT AND TRADEMARK OFFICE
CERTIFICATE OF CORRECTION

PATENT NO. : 12,124,883 B2
APPLICATION NO. : 17/223907
DATED : October 22, 2024
INVENTOR(S) : Wang et al.

Page 1 of 1

It is certified that error appears in the above-identified patent and that said Letters Patent is hereby corrected as shown below:

In the Claims

In Column 20, Line 37, in Claim 10, after "based on", delete "the"

In Column 21, Line 2, in Claim 16, delete "instructions," and insert --instructions-- therefor Signed and Sealed this
Seventeenth Day of December, 2024

Derrick Brent
*Acting Director of the United States Patent and Trademark Office*